(12) United States Patent
Lai et al.

(10) Patent No.: US 11,721,478 B2
(45) Date of Patent: Aug. 8, 2023

(54) RESIDUAL CURRENT DEVICE WITH ELECTROMAGNETIC SHIELDING STRUCTURE

(71) Applicant: DELTA ELECTRONICS, INC., Taoyuan (TW)

(72) Inventors: Wei-Hsun Lai, Taoyuan (TW); You-Jhih Jheng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 327 days.

(21) Appl. No.: 17/158,829

(22) Filed: Jan. 26, 2021

(65) Prior Publication Data

US 2022/0102067 A1 Mar. 31, 2022

(30) Foreign Application Priority Data

Sep. 30, 2020 (CN) .......................... 202022209764.5

(51) Int. Cl.
  *H02H 3/00* (2006.01)
  *H01F 27/36* (2006.01)
  *H02H 1/00* (2006.01)
  *H01F 27/29* (2006.01)
  *H01F 27/26* (2006.01)

(52) U.S. Cl.
  CPC .......... *H01F 27/363* (2020.08); *H01F 27/29* (2013.01); *H02H 1/0007* (2013.01); *H01F 27/266* (2013.01); *H01F 2027/297* (2013.01)

(58) Field of Classification Search
None
See application file for complete search history.

(56) References Cited

U.S. PATENT DOCUMENTS

| 4,507,709 | A | * | 3/1985 | Morris | H01H 83/02 |
| | | | | | D13/160 |
| 4,521,824 | A | * | 6/1985 | Morris | H01H 71/50 |
| | | | | | 361/45 |
| 4,702,002 | A | * | 10/1987 | Morris | H01H 83/144 |
| | | | | | 29/525 |
| 2007/0197092 | A1 | * | 8/2007 | Tanaka | H01R 13/6581 |
| | | | | | 439/607.01 |
| 2012/0001645 | A1 | * | 1/2012 | Javora | H02H 1/0007 |
| | | | | | 324/658 |

* cited by examiner

*Primary Examiner* — Stephen W Jackson
(74) *Attorney, Agent, or Firm* — Chun-Ming Shih; HDLS IPR Services (57) ABSTRACT

A residual current device includes an insulating housing, an electromagnetic induction module, a leakage current detecting module and an electromagnetic shielding structure. The insulating housing includes a base and a lid. The electromagnetic induction module is disposed in the base. The electromagnetic induction module includes a core base and an iron core. The leakage current detecting module is disposed in the base. The leakage current detecting module includes a circuit board assembly, a detecting circuit disposed on the circuit board assembly and a lead frame electrically connected to the circuit board assembly. The electromagnetic shielding structure is disposed in the base and covers the leakage current detecting module. The effect of preventing electromagnetic interference is achieved.

9 Claims, 10 Drawing Sheets

RESIDUAL CURRENT DEVICE WITH ELECTROMAGNETIC SHIELDING STRUCTURE

BACKGROUND OF THE INVENTION

Technical Field

The disclosure relates to a residual current device, and more particularly relates to a residual current device with electromagnetic shielding structure.

Description of Related Art

A residual current device (RCD) is a safety device preventing fatal electric shock. When detecting the residual current exceeds the reference value, the RCD either switches off the circuit of the protected electrical appliance immediately or send out an alarm signal to trip other protection procedures accordingly. The RCD is an effective protective measure to prevent electric shock, electrical fire, or damages of electrical equipment.

However, the RCD may radiate electromagnetic waves to the surrounding environment during operation due to the changes of its electromagnetic field and may cause radio frequency interference (RFI) problems. In addition, the electromagnetic waves may exceed the limit value regulated by the EMC (Electromagnetic Compatibility) standards in certain frequency bands when the radiated magnetic field is greater than normal condition. Thus, the operation of devices, the nearby electronic equipment and even the human body may be affected by the RCD.

In view of the above drawbacks, the inventor proposes the present invention based on his expert knowledge and elaborate researches in order to solve the problems of prior art.

SUMMARY OF THE INVENTION

An object of this disclosure is to provide a residual current device to solve the above-mentioned electromagnetic interference problems.

In order to achieve the object mentioned above, this disclosure provides a residual current device with electromagnetic shielding structure. The residual current device includes an insulating housing, an electromagnetic induction module, a leakage current detecting module and an electromagnetic shielding structure. The insulating housing includes a base and a lid covering the base. The electromagnetic induction module is disposed in one side of the base, including a core base and an iron core disposed in the core base. The leakage current detecting module is disposed in another side of the base, including a circuit board assembly, a detecting circuit disposed on the circuit board assembly and a lead frame electrically connected to the circuit board assembly. The electromagnetic shielding structure is disposed in the base and covers the leakage current detecting module.

Comparing to the related art, the residual current device of this disclosure is provided with an electromagnetic shielding structure. The electromagnetic shielding structure is disposed in the base of the residual current device and covers the leakage current detection module, shielding the leakage current detection module through a metal shielding body to prevent the electromagnetic wave radiated by the residual current device from affecting other external electronic devices and human body, so as to increase the practicality of this disclosure.

BRIEF DESCRIPTION OF DRAWINGS

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of embodiments, being not used to limit its executing scope. Any equivalent variation and modification made according to appended claims is all covered by the claims claimed by the present invention.

Figure 1:
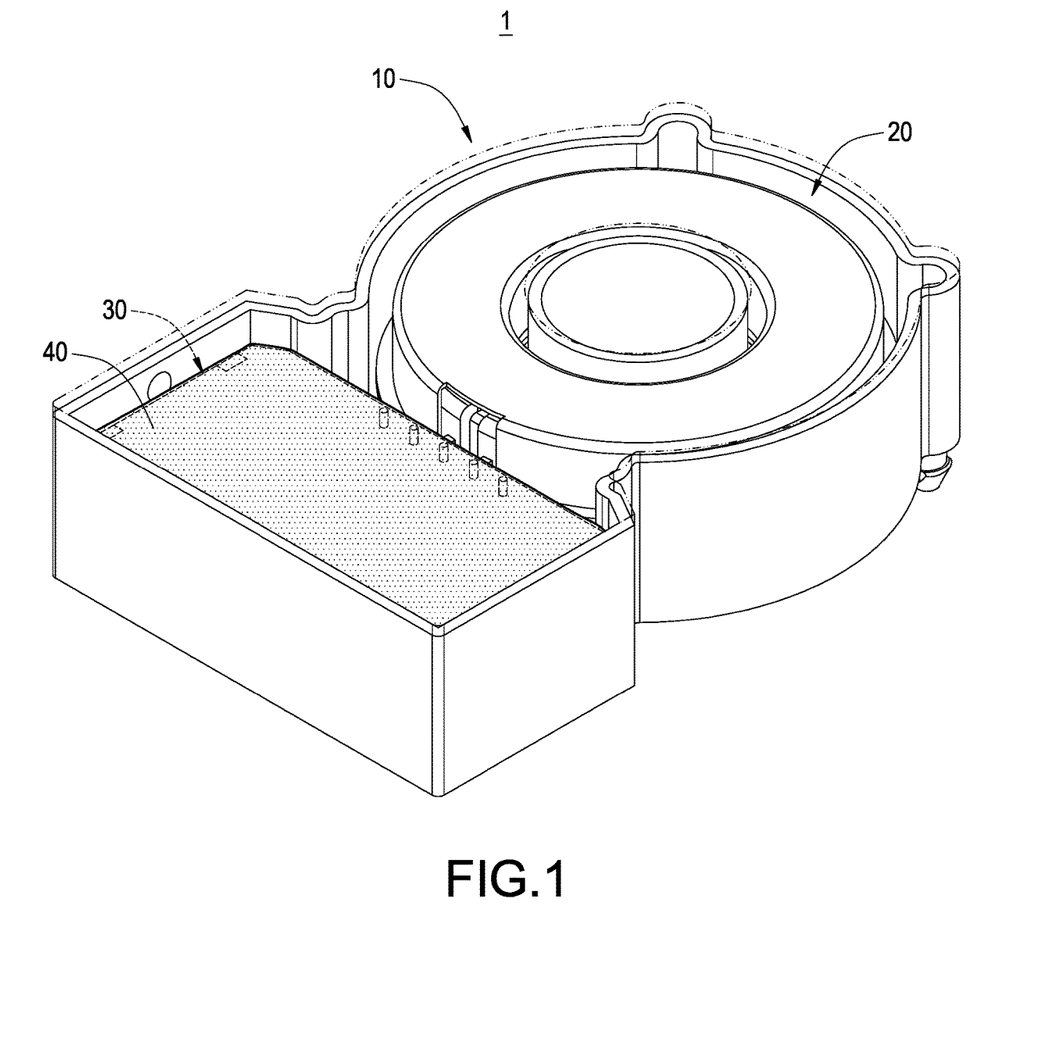
FIG. 1 and FIG. 2 are perspective schematic views from two sides of an exemplary residual current device with electromagnetic shielding structure of this disclosure.
Figure 2:
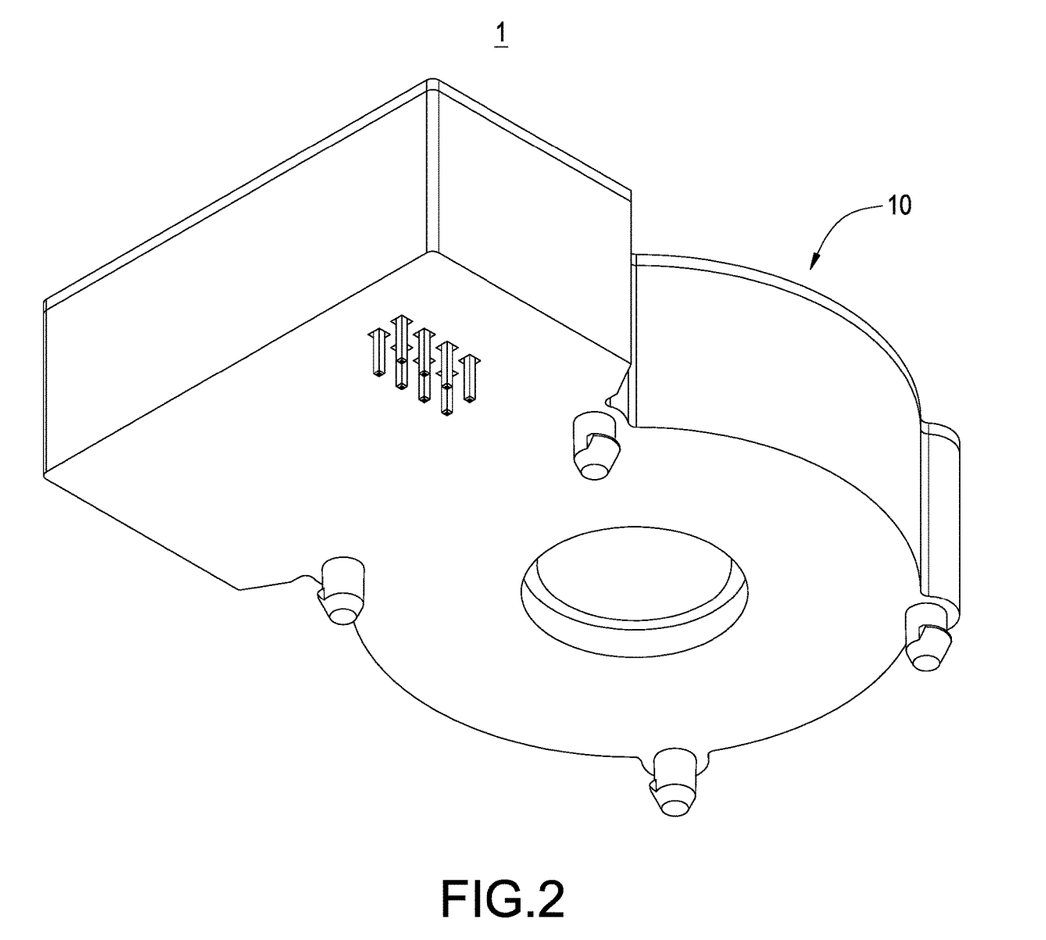

FIG. 1 and FIG. 2 depict perspective schematic views from two sides of an exemplary residual current device with electromagnetic shielding structure of this disclosure. The residual current device 1 includes an insulating housing 10, an electromagnetic induction module 20, a leakage current detecting module 30 and an electromagnetic shielding structure 40. The electromagnetic induction module 20 and the leakage current detecting module 30 are disposed in the insulating housing 10. The electromagnetic shielding structure 40 shields the leakage current detecting module 30. Thereby, the radio frequency interference from the electromagnetic wave radiated by the residual current device 1 during operation may be prevented. A more detailed description of the structure of the residual current device 1 is as follows.

Figure 3:
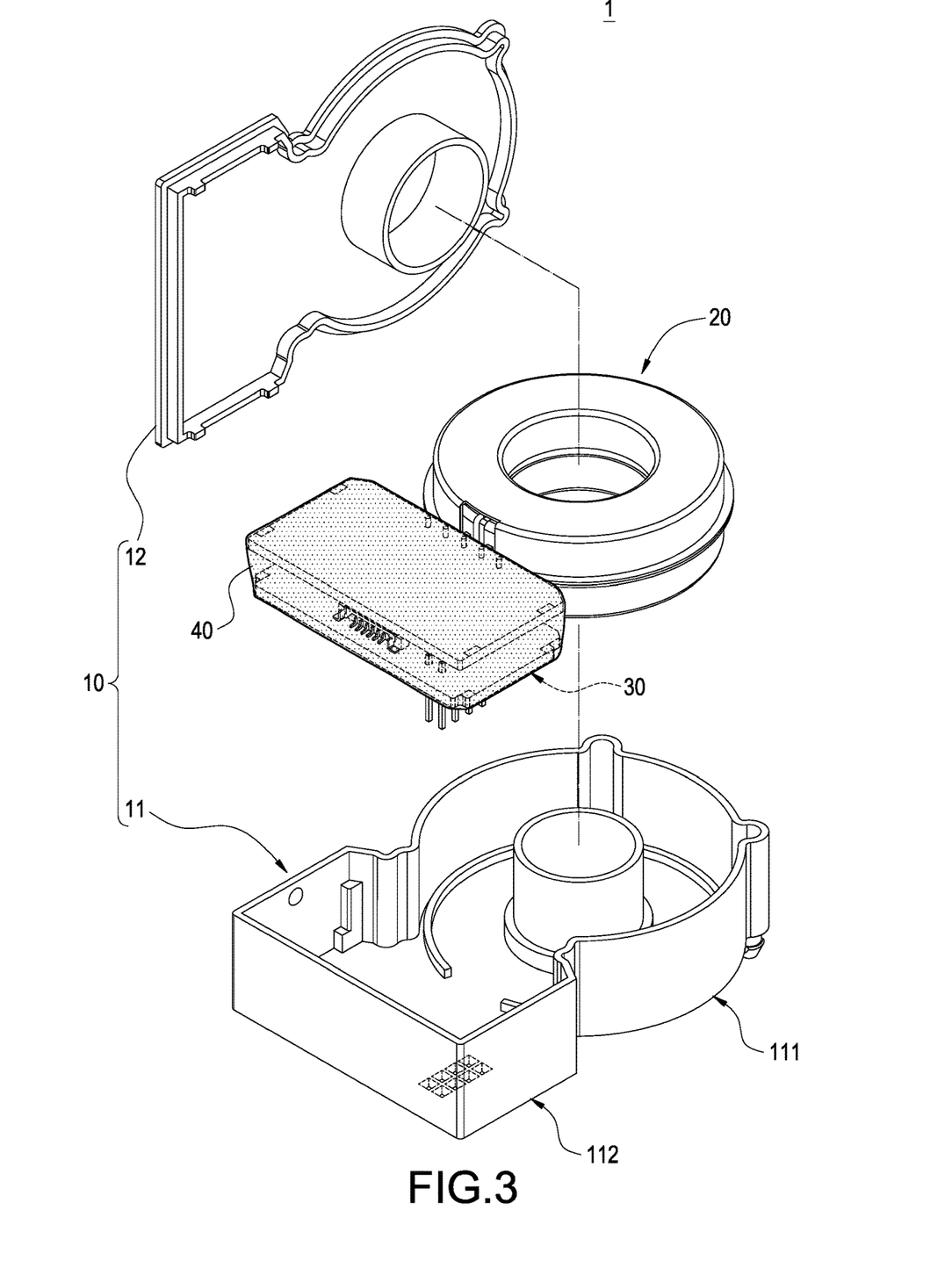
FIG. 3 is a perspective exploded view of an exemplary residual current device with electromagnetic shielding structure of this disclosure.
Figure 4:
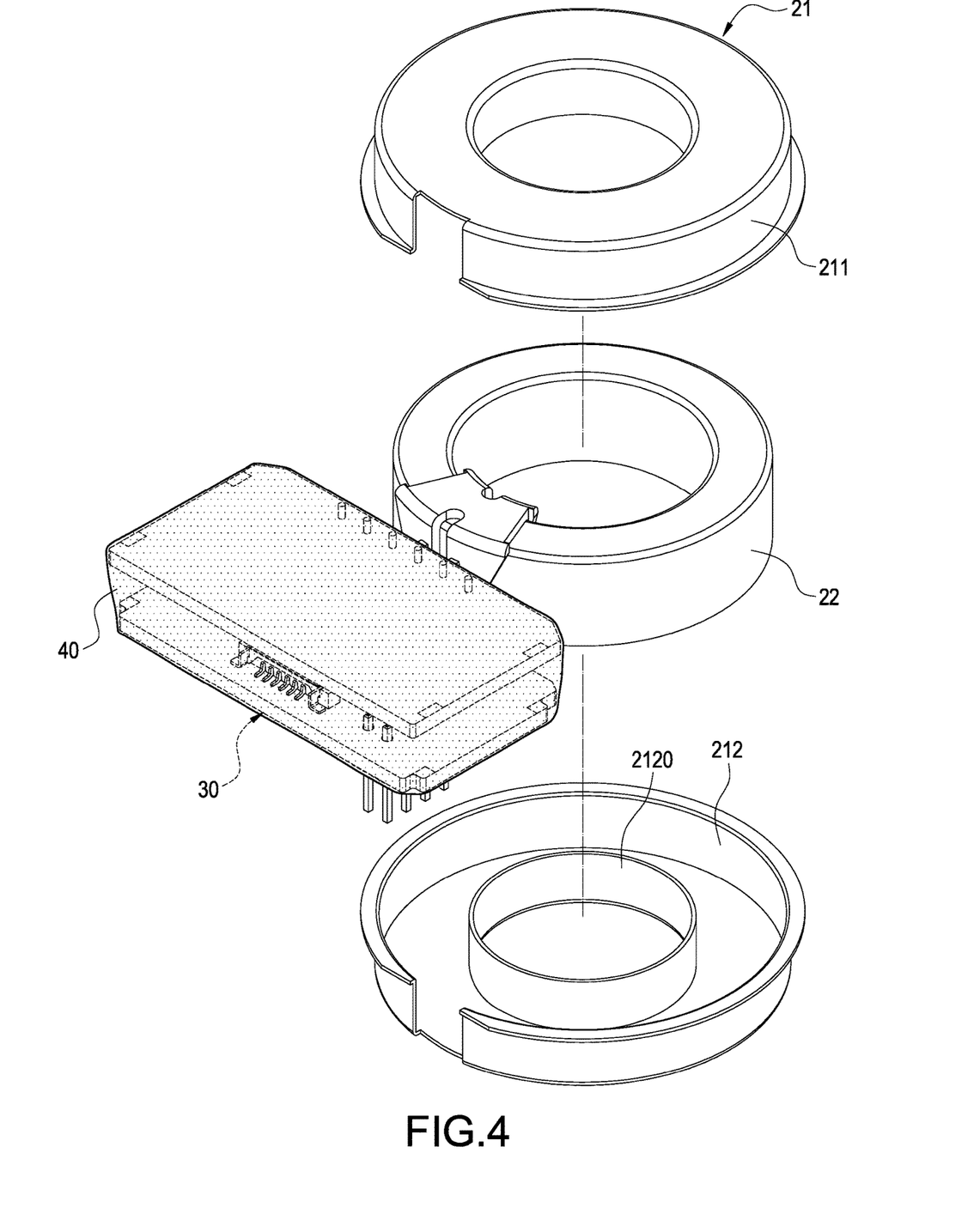
FIG. 4 is a perspective exploded view of an exemplary electromagnetic induction module of this disclosure.
Figure 5:
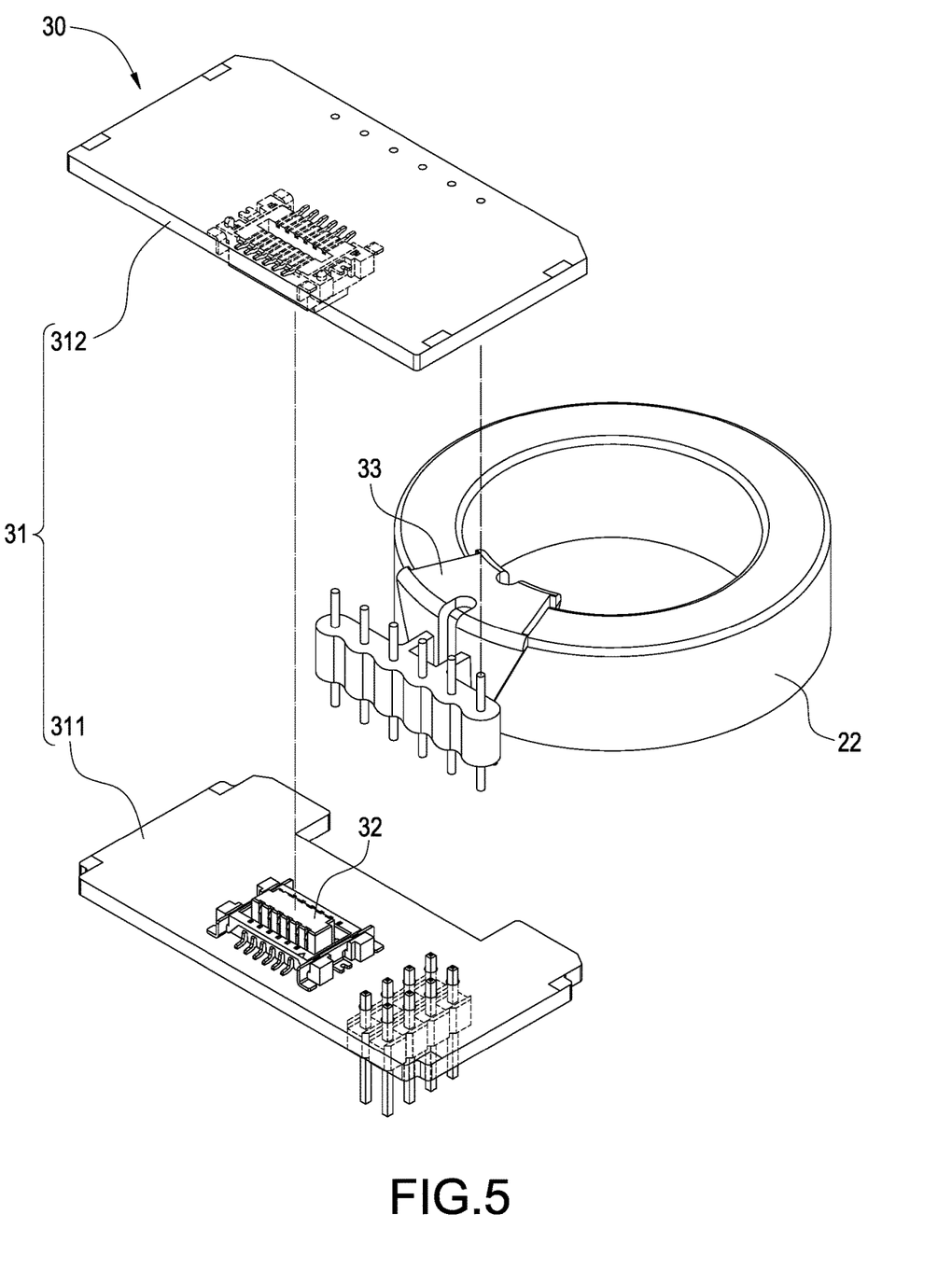
FIG. 5 is a perspective exploded view of an exemplary leakage current detecting module of this disclosure.

FIG. 3 to FIG. 5 depict a perspective exploded view of an exemplary residual current device with electromagnetic shielding structure, a perspective exploded view of an exemplary electromagnetic induction module and a perspective exploded view of an exemplary leakage current detecting module of this disclosure. The insulating housing 10 includes a base 11 and a lid 12 covering the base 11. In one embodiment of this disclosure, the base 11 includes an annular cylinder 111 and a rectangular body 112 extended from the annular cylinder 111. The annular cylinder 111 and the rectangular body 112 are internally connected. The lid 12 is assembled (or connected) and fixed to the base 11. The outline of the lid 12 matches the outline of the base 11.

The electromagnetic induction module 20 is disposed in one side of the base 11, including a core base 21 and an iron core 22 disposed in the core base 21. In this embodiment, the core base 21 and the iron core 22 are disposed in the annular cylinder 111 and respectively configured in a ring shape corresponding to the annular cylinder 111.

Specifically, the core base 21 is a metal housing for shielding the external magnetic field. Moreover, the core base 21 may include a lower core base 211 and an upper core base 212 assembled (or connected) with each other. The lower core base 211 and the upper core base 212 are formed with a positioning ring plate 2120 respectively. The iron core 22 configured in the ring shape is confined by the positioning ring plate 2120 and positioned in the core base 21.

Moreover, the leakage current detecting module 30 is disposed in another side of the base 11. The leakage current detecting module 30 includes a circuit board assembly 31, a detecting circuit 32 disposed on the circuit board assembly 31 and a lead frame 33 electrically connected to the circuit board assembly 31.

In one embodiment of this disclosure, the circuit board assembly 31 includes a first circuit board 311 and a second circuit board 312. In addition, one end of the lead frame 33 is disposed on the iron core 22, and another end of the lead frame 33 is connected to the first circuit board 311 and the second circuit board 312.

Furthermore, the electromagnetic shielding structure 40 is disposed in the base 11 and covers the leakage current detecting module 30.

Figure 6:
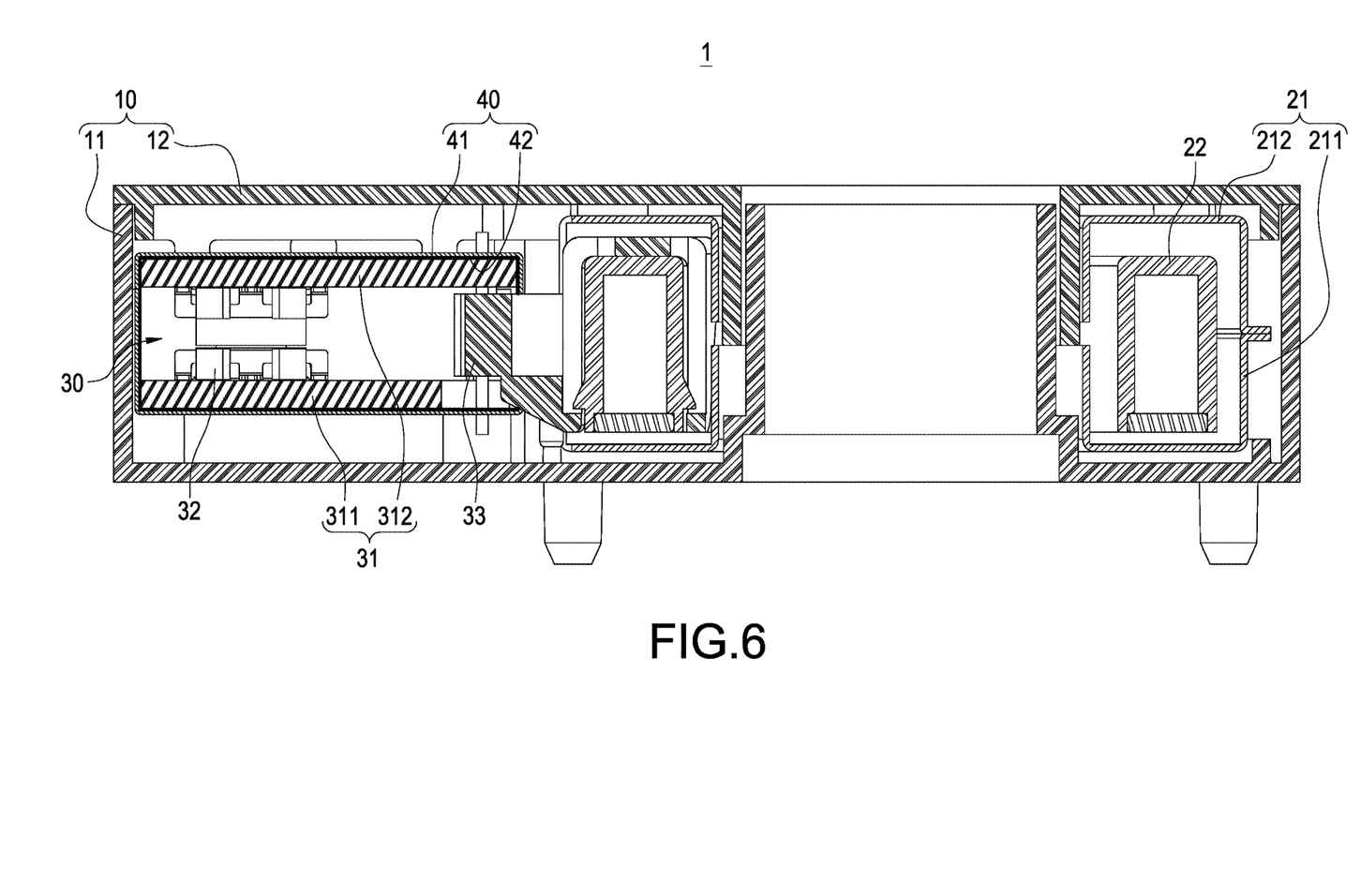
FIG. 6 to FIG. 8 are cross sectional views of an exemplary residual current device with electromagnetic shielding structure of this disclosure.
Figure 7:
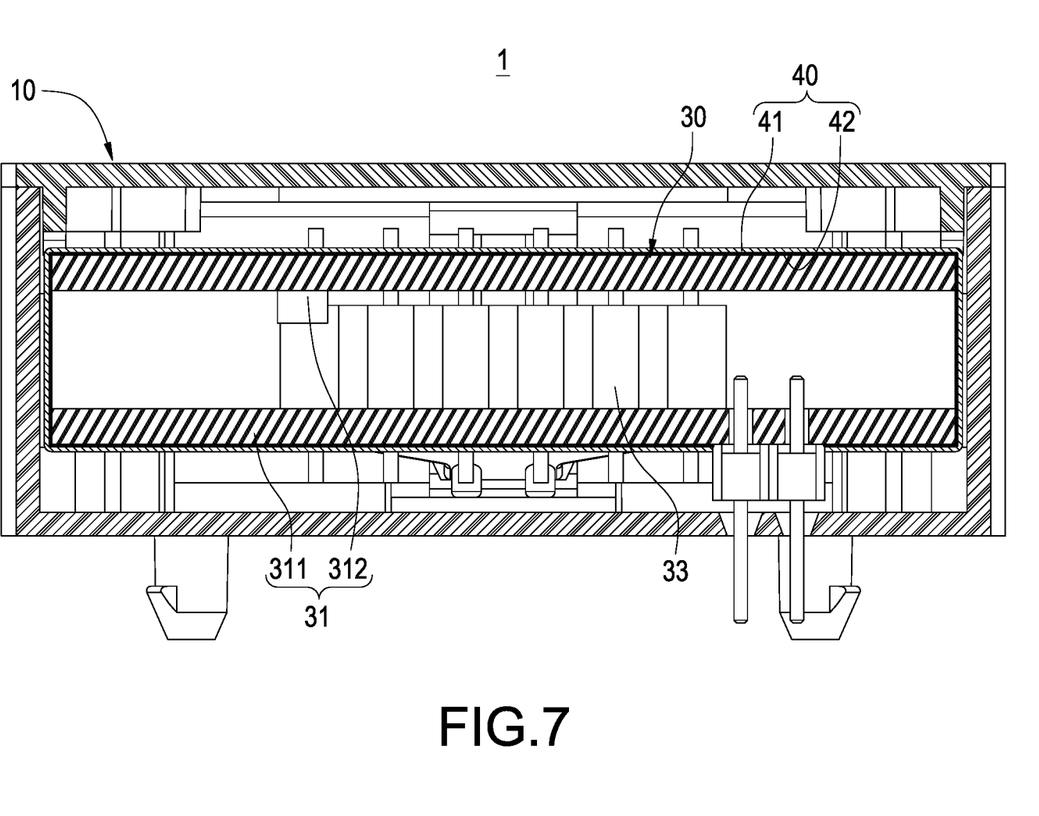
Figure 8:
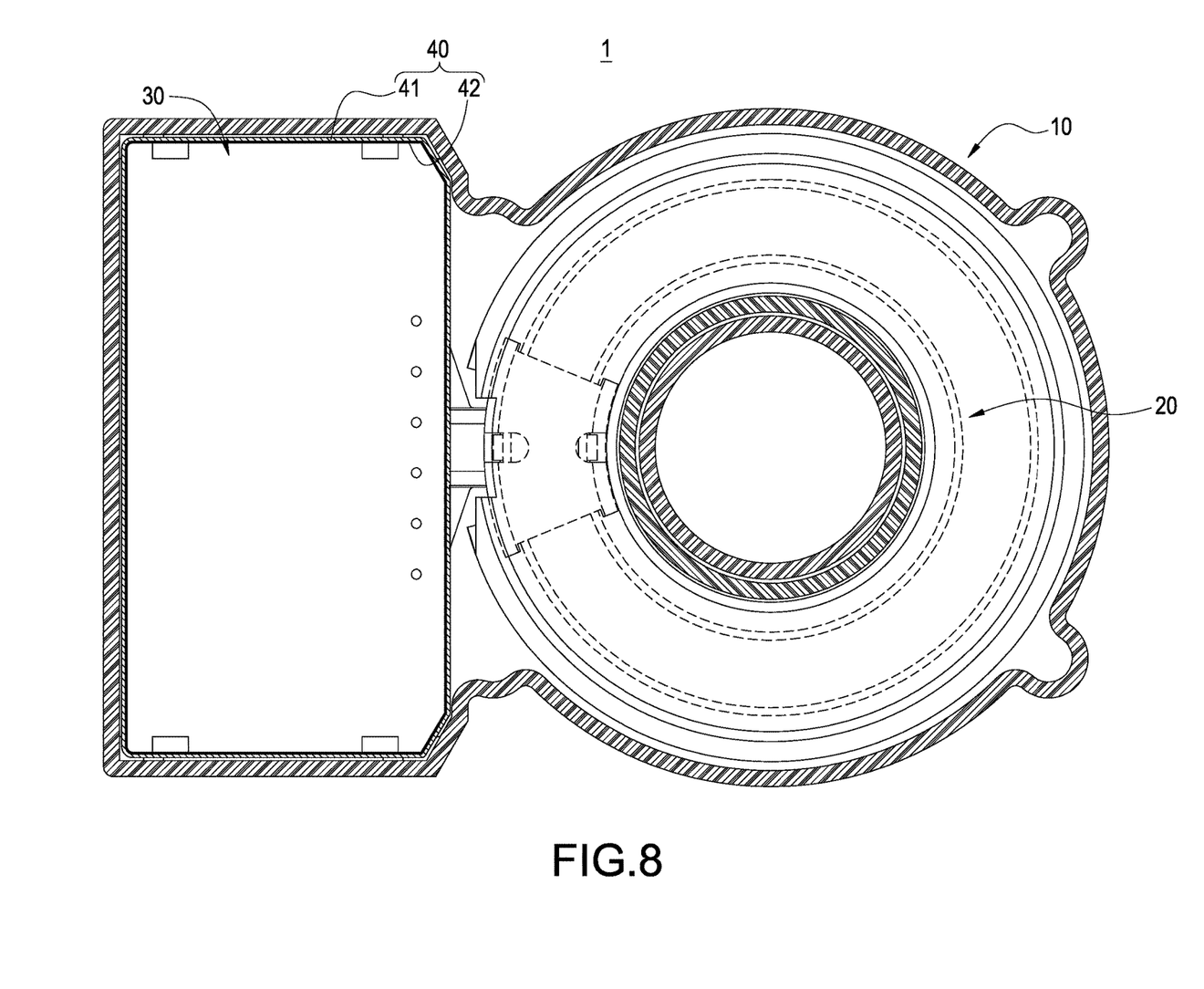

FIG. 6 to FIG. 8 depict cross sectional views of an exemplary residual current device with electromagnetic shielding structure of this disclosure. As shown in the figures, in one embodiment of this disclosure, the electromagnetic shielding structure 40 may include a metal shielding body 41 and an insulating sheet 42. The insulating sheet 42 covers the first circuit board 311 and the second circuit board 312. The metal shielding body 41 covers an outer side of the insulating sheet 42. Thereby, the insulating sheet 42 is used to isolate the metal shielding body 41 and the leakage current detecting module 30 to prevent the metal shielding body 41 from directly contacting the leakage current detecting module 30, which may cause a short circuit. This way, the metal shielding body 41 may shield the leakage current detecting module 30, thereby preventing the radio frequency interference from the electromagnetic wave radiated by the residual current device during operation.

Figure 9:
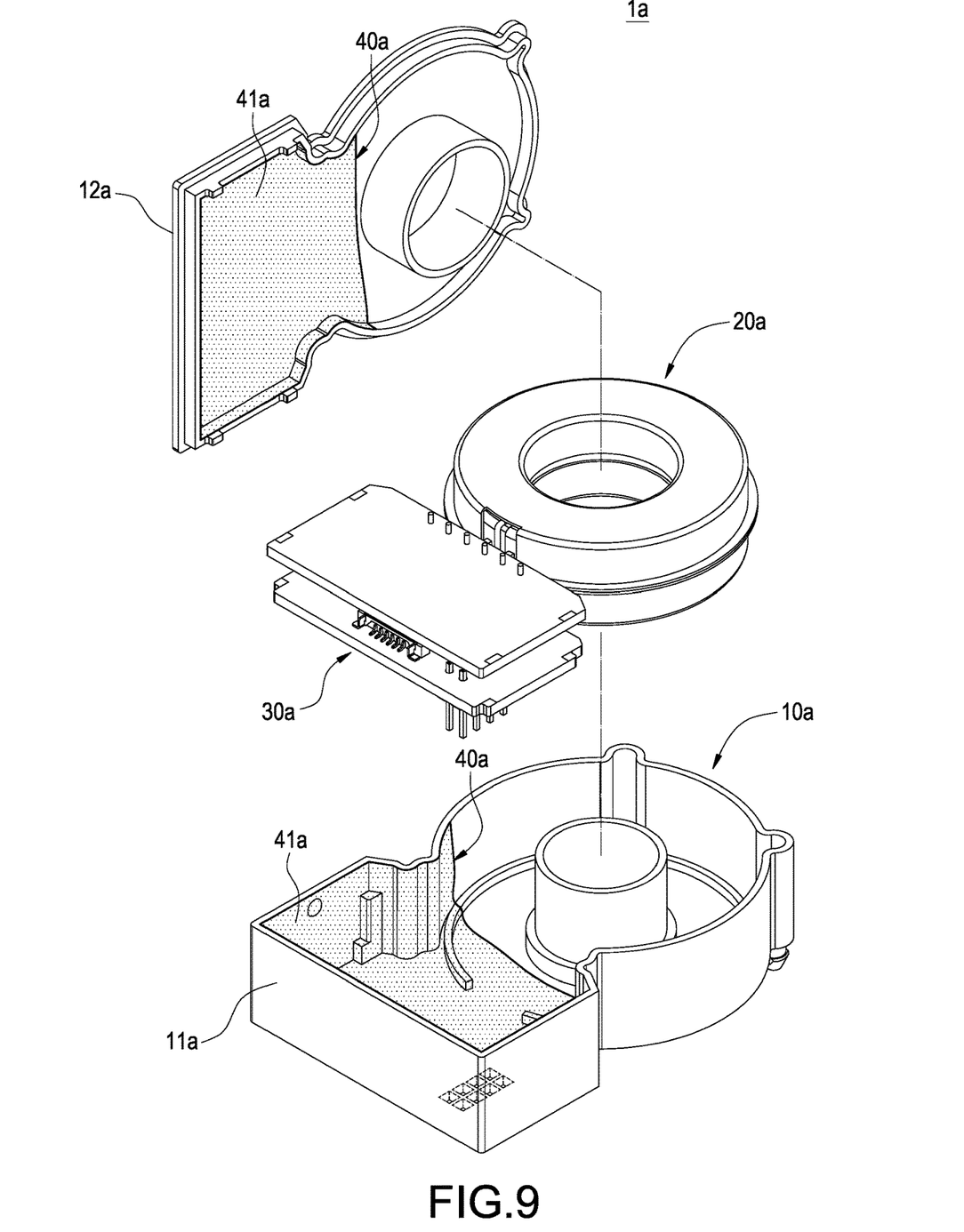
FIG. 9 is a perspective exploded view of another embodiment of the residual current device with electromagnetic shielding structure of this disclosure.

FIG. 9 depicts a perspective exploded view of another embodiment of the residual current device with electromagnetic shielding structure of this disclosure. In this embodiment, the residual current device 1a includes an insulating housing 10a, an electromagnetic induction module 20a, a leakage current detecting module 30a and an electromagnetic shielding structure 40a. The electromagnetic shielding structure 40a includes a metal shielding body 41a.

In more detail, the metal shielding body 41a may be a metal foil, such as, but not limited to, a copper foil in this disclosure. In addition, as the metal foil has flexibility, the metal shielding body 41a is attached to the inner walls of the insulating housing 10a collectively formed by the base 11a and the lid 12a. Therefore, when the lid 12a is assembled to the base 11a, the electromagnetic shielding structure 40a may form a shielding space to shield the leakage current detecting module 30a. It should be noted that, the metal shielding body 41a may shield the leakage current detecting module 30a solely. That is, the electromagnetic shielding structure 40a may be attached to the rectangular portion where the base 11a and the lid 12a are provided to accommodate the leakage current detecting module 30a. In some embodiments, the metal shielding body 41a may be attached to the entire inner walls of the lid 12a and the base 11a.

Figure 10:
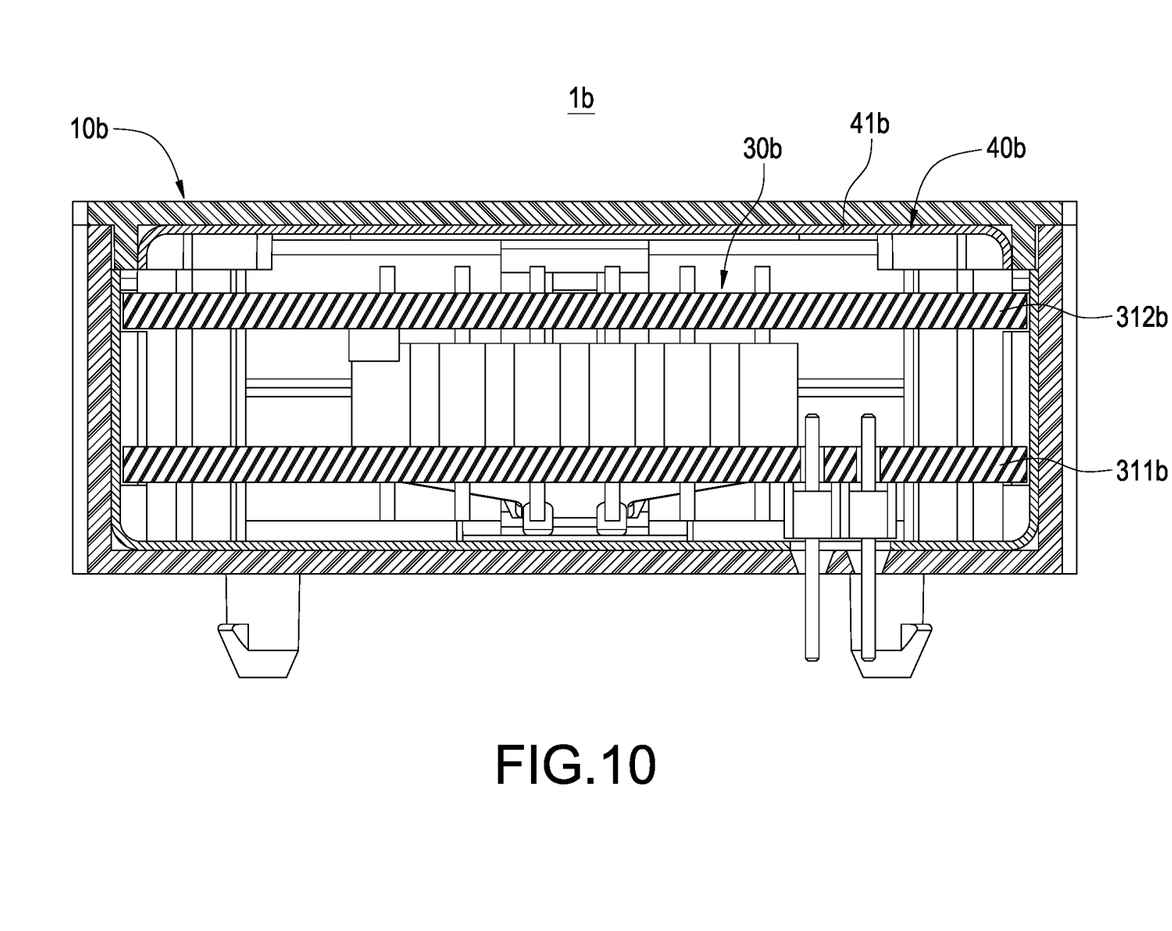
FIG. 10 is a cross sectional view of a still another embodiment of the residual current device with electromagnetic shielding structure of this disclosure.

FIG. 10 depicts a cross sectional view of still another embodiment of the residual current device with electromagnetic shielding structure of this disclosure. In the present embodiment, the residual current device 1b includes an insulating housing 10b, an electromagnetic induction module (not shown), a leakage current detecting module 30b and an electromagnetic shielding structure 40b. The electromagnetic shielding structure 40b includes a metal shielding body 41b.

Specifically, the metal shielding body 41b may be a metal shell. The metal shell covers the first circuit board 311b and the second circuit board 312b. Thereby, the metal shielding body 41b may shield the leakage current detecting module 30b. Thus, the radio frequency interference from electromagnetic wave is prevented.

Although the present invention has been described with reference to the embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A residual current device with electromagnetic shielding structure, the residual current device comprising:
   an insulating housing comprising a base and a lid covering the base;
   an electromagnetic induction module disposed in one side of the base, said electromagnetic induction module comprising a core base and an iron core disposed in the core base;
   a leakage current detecting module disposed in another side of the base, said leakage current detecting module comprising a circuit board assembly, a detecting circuit disposed on the circuit board assembly and a lead frame electrically connected to the circuit board assembly; and
   an electromagnetic shielding structure comprising a metal shielding body, said electromagnetic shielding structure accommodated in the base to cover the leakage current detecting module.

2. The residual current device according to claim 1, wherein the base comprises an annular cylinder and a rectangular body extended from the annular cylinder, and inside of the annular cylinder and inside of the rectangular body are communicated, and the lid is connected and fixed with the base, an outline of the lid is corresponding to an outline of the base.

3. The residual current device according to claim 2, wherein the core base and the iron core are disposed in the annular cylinder and configured in a ring shape corresponding to the annular cylinder.

4. The residual current device according to claim 1, wherein the core base comprises a lower core base and an upper core base assembled with each other, and the lower core base and the upper core base comprise a positioning ring plate respectively.

5. The residual current device according to claim 1, wherein the core base comprises a metal housing.

6. The residual current device according to claim 1, wherein the circuit board assembly comprises a first circuit board and a second circuit board, and one end of the lead frame is disposed on the iron core, and another end of the lead frame is connected to the first circuit board and the second circuit board.

7. The residual current device according to claim 6, wherein the electromagnetic shielding structure further comprises an insulating sheet and a metal shielding body, and the insulating sheet covers the first circuit board and the second circuit board, and the metal shielding body covers an outer side of the insulating sheet.

8. The residual current device according to claim 2, wherein the metal shielding body is attached to an inner wall of the rectangular body.

9. The residual current device according to claim 1, wherein the metal shielding body comprises a metal shell, and the metal shell covers the circuit board assembly.

* * * * *